Oct. 13, 1942.   D. T. BRIDGES   2,298,925
MECHANISM FOR HANDLING ENDLESS FILM
Filed Jan. 27, 1940   6 Sheets-Sheet 1
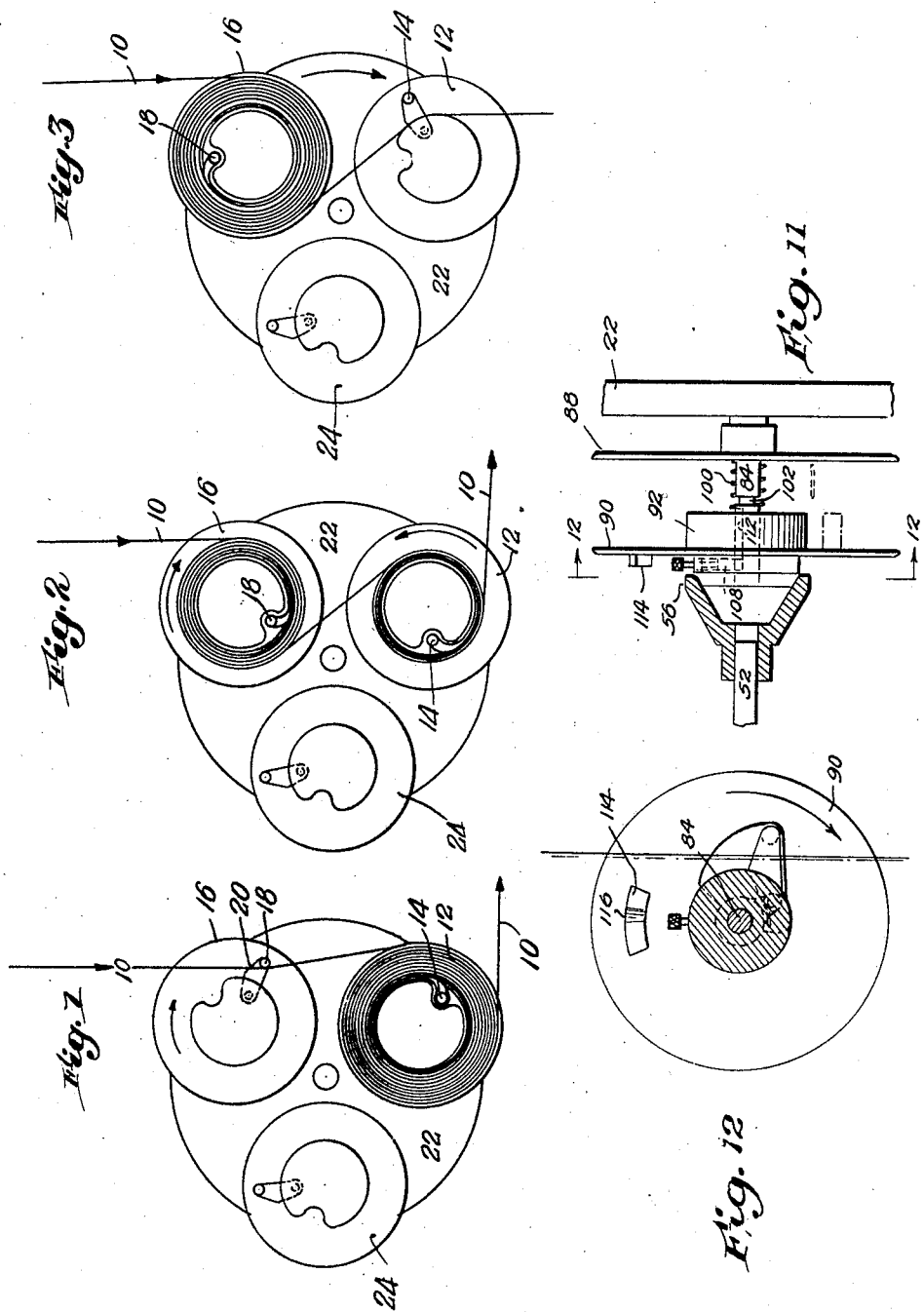
Inventor
DANIEL THURBER BRIDGES
by Thomson & Thomson
his Attys.

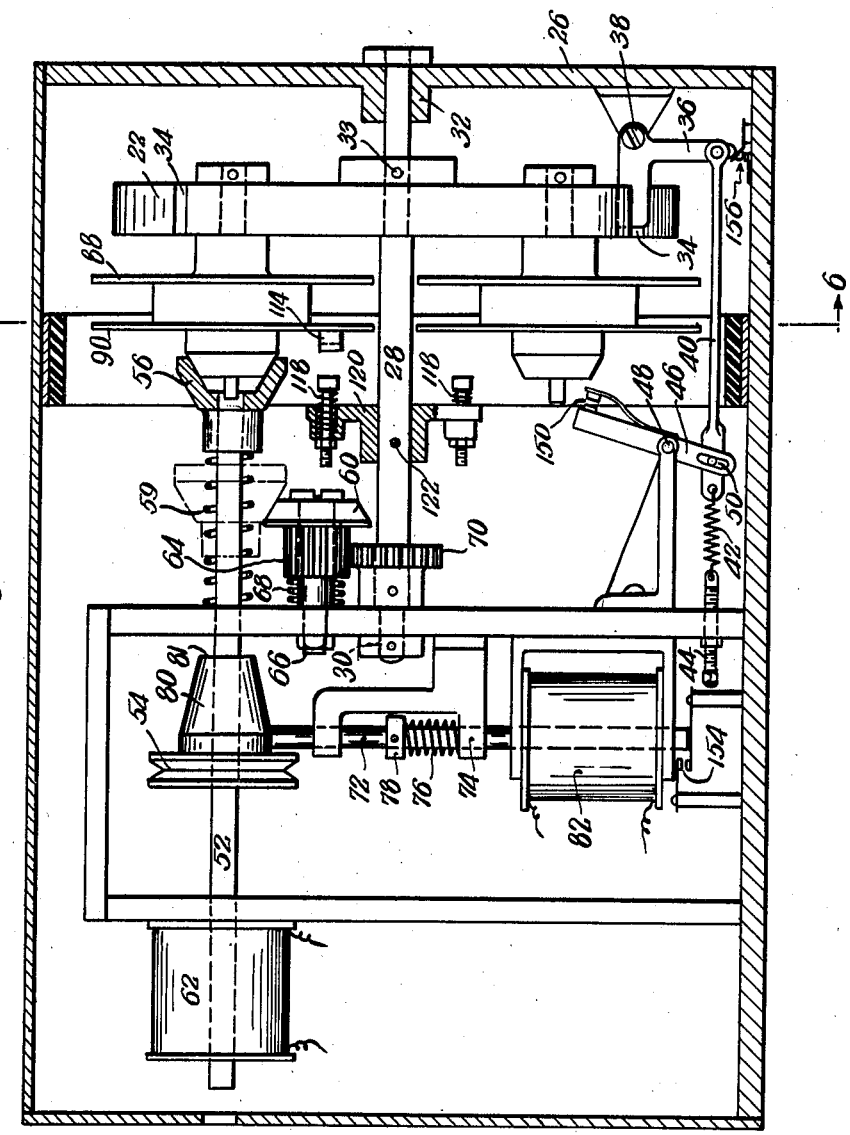

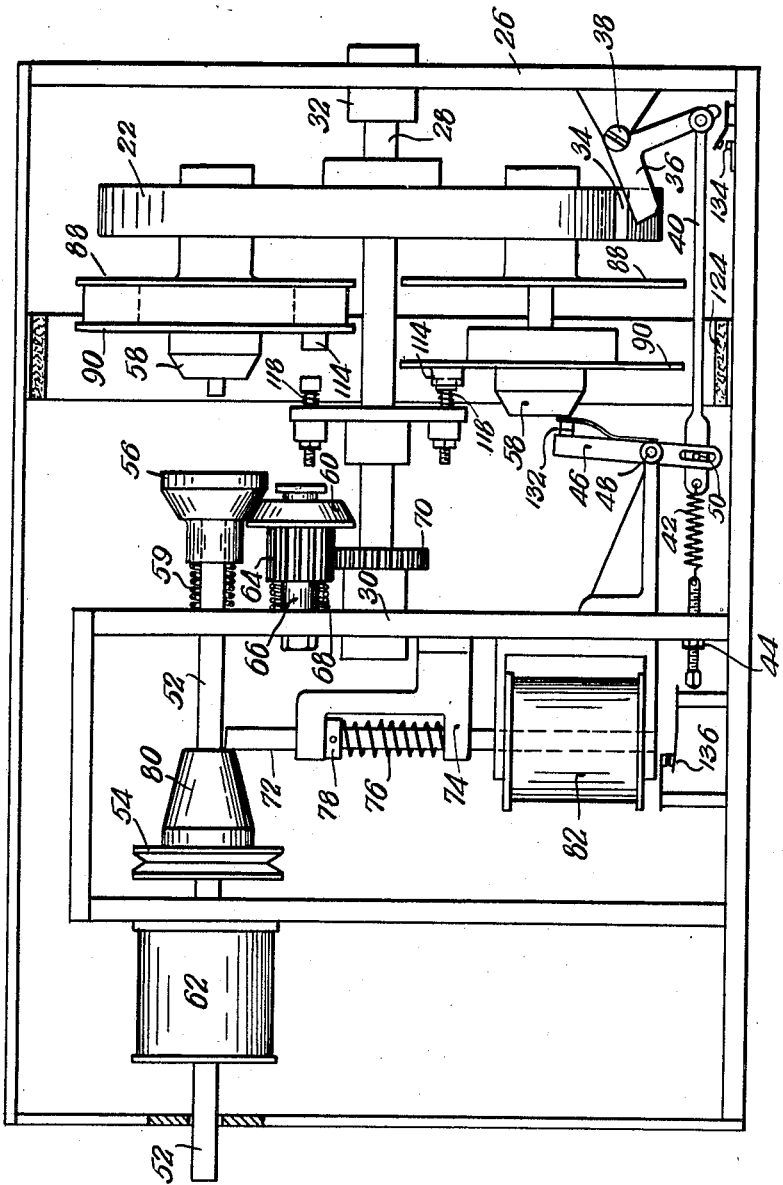

Oct. 13, 1942.  D. T. BRIDGES  2,298,925
MECHANISM FOR HANDLING ENDLESS FILM
Filed Jan. 27, 1940  6 Sheets-Sheet 4

Inventor
DANIEL THURBER BRIDGES
by Thomas & Thomas
his Attys.

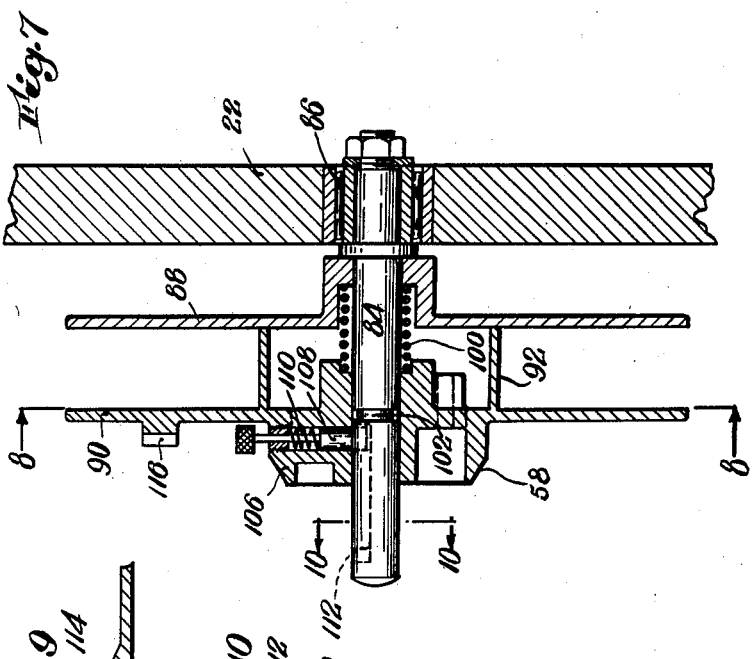
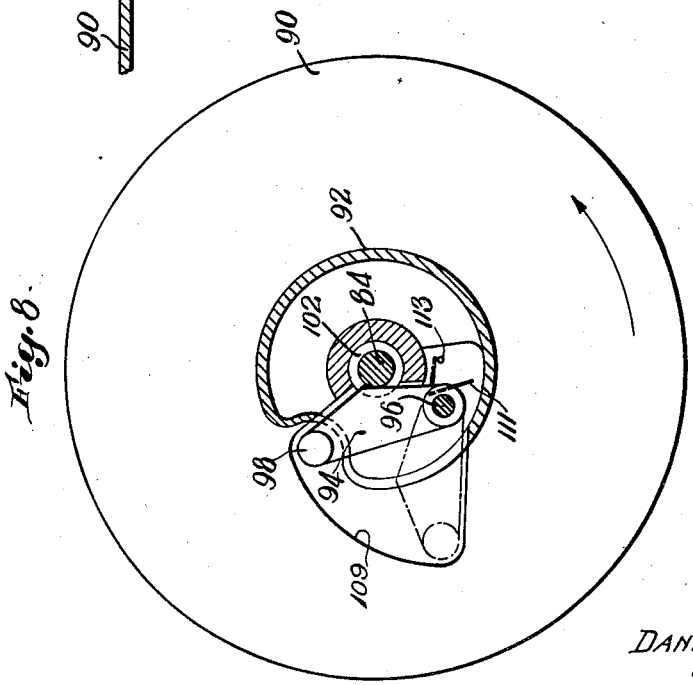

Oct. 13, 1942.   D. T. BRIDGES   2,298,925
MECHANISM FOR HANDLING ENDLESS FILM
Filed Jan. 27, 1940   6 Sheets-Sheet 6

Inventor
DANIEL THURBER BRIDGES
by Thompson & Thompson
his Attys.

Patented Oct. 13, 1942

2,298,925

UNITED STATES PATENT OFFICE 2,298,925

MECHANISM FOR HANDLING ENDLESS FILM

Daniel Thurber Bridges, Auburn, Mass.

Application January 27, 1940, Serial No. 316,023

2 Claims. (Cl. 88—18.7)

This invention relates to improvements in mechanism for handling endless film or other strip material in the form of a continuous loop whereby the film may be continuously projected in the same direction without interruption.

There is a commercial need for continuous projection motion picture equipment in which the film used is in the form of an endless loop. Various mechanisms have been designed to handle endless film but are usually limited to a small supply or a relatively short length of film due to the design of the reeling mechanism in which the film is wound upon the outside of a reel, and at the same time unwound from the inside of the same reel; since the stock of film on the reel remains constant, the inner coils must be free from continuous slippage, and this slippage, which cannot be avoided in this type of apparatus, results in considerable wear on the film.

It is an object of my invention to provide apparatus for feeding endless film continuously in the same direction to a projector, which apparatus is designed to handle relatively long loops of film and in which the film is substantially continuously unwinding from one reel and winding on to another reel instead of winding on and unwinding from the same reel as has been the customary practice in reeling endless loop film.

It is further an object of my invention to provide means for winding film in a doubled loop on a single reel, whereby one half of the supply is drawn from the projector and the other half from a similar reel which is unwinding a doubled loop of film delivered half to the projector and half to the winding reel.

It is a still further object of my invention to provide means for automatically shifting the winding apparatus when one reel is empty so that winding of the film continues in a similar manner without interruption in the travel of the film in the same direction to the projector.

Specifically, in one embodiment of my invention I provide a movable disc member having a plurality of reels mounted thereon, one of the reels being normally in a winding position and being driven to wind the film in a double coil, and I provide means operable when an unwinding reel becomes empty for shifting the disc member to bring an empty reel to the winding position in such a manner that the film will be picked up and wound in a double coil thereon as it is rotated, whereby the operation is automatically continued without requiring the attention of the operator.

Another object of my invention is the provision of film reeling mechanism which may be used with any standard projecting equipment to handle an endless loop of film in such a manner that the entire film may be shown once without requiring rewinding, leaving the coiled film on a reel in readiness to be projected again without rewinding.

Further objects and advantages of my improvements will be more readily apparent from the following disclosure of preferred embodiments thereof taken in connection with the attached drawings, in which:

Figs. 1, 2 and 3 are diagrammatic views illustrating the method of operation;

Fig. 4 is a vertical section taken longitudinally through the casing showing the operating mechanism in position for reeling the film;

Fig. 5 is a view similar to Fig. 4 showing the mechanism in position for shifting of the reels to bring an empty reel to the winding position;

Fig. 7 is a detail enlarged vertical section showing the mounting of the reel;

Fig. 8 is a sectional view taken on the plane indicated 8—8 in Fig. 7;

Fig. 9 is a detail section showing the locking abutment on the face of the reel;

Fig. 10 is a detail section taken on the plane indicated 10—10 in Fig. 7;

Fig. 11 is an elevation partly in section showing the separation of the reel parts to permit release of the film;

Fig. 12 is a sectional view taken on the plane indicated 12—12 in Fig. 11;

Figure 6:
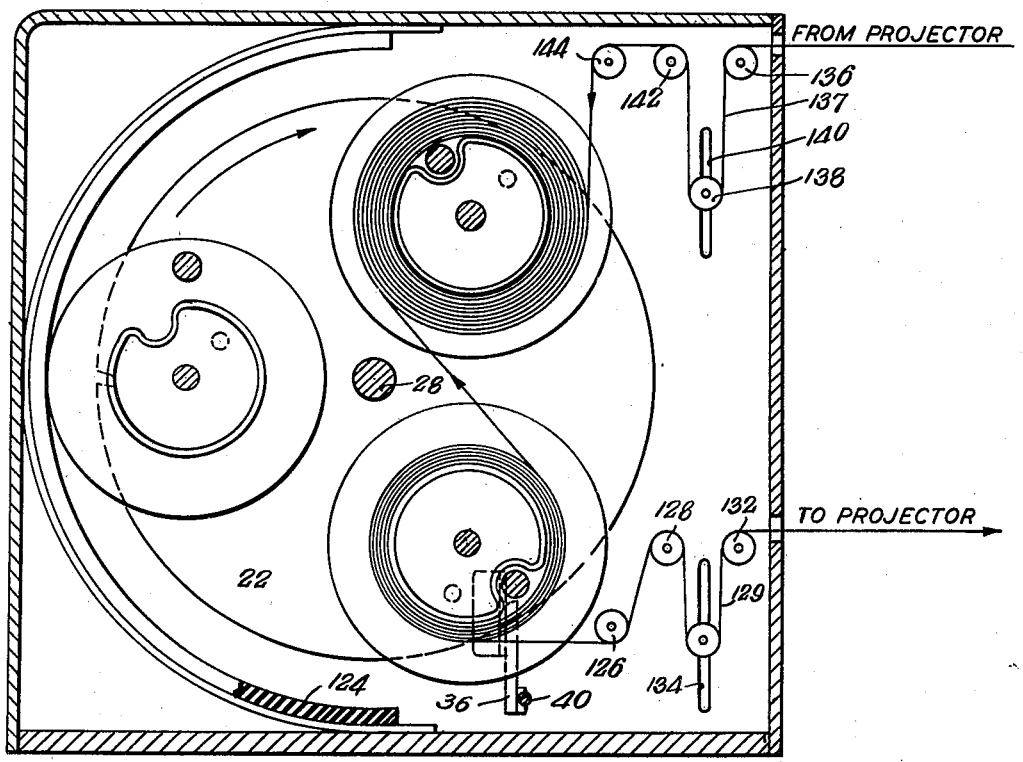
Fig. 6 is a vertical section taken on the plane indicated 6—6 in Fig. 4.

The operation of the reeling mechanism may be most clearly understood from Figs. 1 to 3. The continuous loop of untwisted film 10 is initially wound in double coils upon the reel 12 with the inner end of the loop around the pin 14 and the outer end of the loop being loose and free to be placed through the feeding path of the projecting equipment. This will bring a portion of the film adjacent the empty reel 16 and the pin 18 on lever arm 20 will be in position to pick up a loop of the film as the reel starts to rotate in a clockwise direction as shown in Fig. 1. The reel 16 will therefore draw film from the projector and at the same time draw film from reel 12 which is unwinding and delivering film to the projector.

Fig. 2 illustrates the movement of the film and rotation of the reels during this stage.

When the reel 12 becomes empty the pin 14 is released from the film and the disc 22 on which the reels are mounted is rotated clockwise 120 degrees from the position of Fig. 3 bringing an empty reel 24 into position for picking up and winding the film and placing the full reel 16 in position for unwinding. The operation will then continue as in Fig. 2. It should be understood that in this arrangement only two reels spaced 180 degrees apart are required as the empty reel could be immediately moved to the winding position, but a third intermediate reel is incorporated in the preferred embodiment in order to obtain a better design and smoother operation.

As an illustrative embodiment of mechanism for carrying out the functions above described, reference may be made to Figs. 4 and 5 in which the casing 26 rotatably supports the shaft 28 for disc 22 at bearings 30 and 32. The disc 22 is fixed by pin 33 to the shaft 28. The disc is provided at its periphery with three notches 34 disposed 120 degrees apart. An L-shaped lever 36 pivotally mounted at 38 on the casing 26 is normally urged to engage one of the notches 34 through the provision of link 40 and tension spring 42 connected to an adjustable set screw 44. A switch lever 46 pivotally mounted at 48 and connected to the link 40 by the pin and slot 50, is moved as hereinafter described to release the lever 36 and permit the partial rotation of disc 22.

The drive shaft 52 is suitably driven from a motor (not shown) by pulley 54. The shaft 52 is rotatably and slidably mounted in casing 26 and carries at its inner end a friction clutch member 56, the inner face of which is formed to frictionally engage and drive the cone 58 of one of the reels which is in winding position. The shaft is urged towards the cone 58 by spring 59. The outer face of the clutch member 56 is formed to frictionally engage and drive the friction disc 60 when the shaft is retracted by the solenoid 62. The disc 60 and pinion gear 64 which is fixed thereto are freely rotatable on stud 66 and a spring 68 acts to maintain the frictional engagement of the clutch faces. The gear 64 meshes with a gear 70 pinned to the shaft 28.

When the shaft 52 is retracted by solenoid 62 it is temporarily held in position by the locking pin 72 which is slidable in the mounting bracket 74 and resiliently urged to locking position by the compression spring 76 acting on collar 78. The pin 72 normally rests on cam 80 and slips past the abutment face 81 of cam 80 when the shaft 52 is retracted. A solenoid 82 is provided to retract pin 72 and release the shaft 52.

The construction of the reels and mounting thereof is shown in Figs. 7 to 12. The pin 84 is rotatably mounted in disc 22 by a needle bearing 86. The reel is composed of an inner plate 88 and an outer plate 90 having an annular flange or hub 92 on which the film is wound. The outer plate also carries a lever 94 pivotally supported at 96 and having at its outer end a pin 98. The parts of the reel are pressed apart by the spring 100, but the outer plate may be latched in position against the inner plate by the engagement of lever 94 with a groove 102 in pin 84. The hub 106 of the outer plate also carries a radial pin 108 normally urged by spring 110 to engage a slot 112 cut in pin 84. The reel may be released from the pin 84 by pulling the pin 108 and slipping the reel from the pin 84. The plate 90 has a cutout 109 to allow movement of the lever 94 which is held in its extended position by a spring finger 111 snapping by the pin 113. The plate 90 is provided with a boss 114 having a notch 116 adapted to engage one of the spring pressed fingers 118 which are mounted in the spider 120 fixed by pin 122 to shaft 28. In order to ensure the latching of plate 90 in its proper position by one of the fingers 118, a friction band 124 is provided to engage the peripheral edge of plate 90 when in its outer position so that the plate 90 will be turned until it is latched by a finger 118.

The film may be fed from the reels as shown in Fig. 6 in which the film strip from the unwinding reel passes around guide rollers 126 and 128 and depends in a loop 129 around roller 130 before passing over a guide roller 132 to the projector. The roller 130 is free to move vertically through the provision of a slotted bearing 134 for the shaft of the roller so that the roller 130 serves to take up the slack particularly when a full reel is moved to unwinding position. In a similar manner the film from the projector passes around a guide roller 136 and depends in a loop 137 around the roller 138 vertically movable in slotted bearing 140. The film then passes around guide rollers 142 and 144 towards the winding reel. The loop 137 provides slack to permit the drawing of film when the full reel moves to unwinding position.

Figure 13:
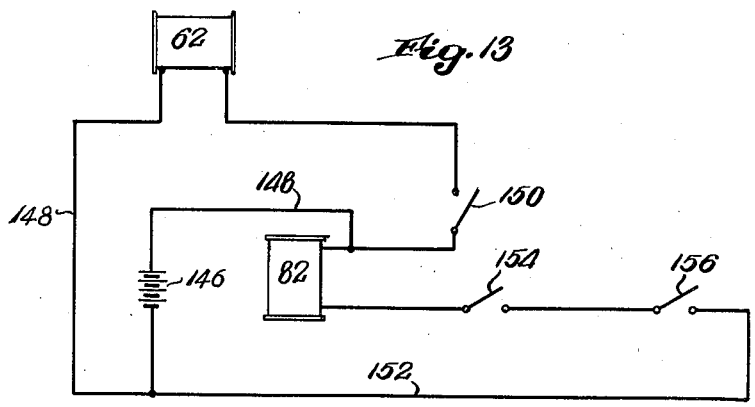
Fig. 13 is a schematic circuit drawing.

The electrical circuit for the solenoids and control switches is schematically shown in Fig. 13. The solenoid 62 is connected to the source of power 146 by a circuit 148 including a switch 150. The solenoid 82 is similarly connected to the source of power 146 by circuit 152 including two switches 154 and 156. While a reel is being wound by shaft 52 both circuits will be open, switch 150 carried by lever arm 46 being normally open and switch 154 being held open by the rod 72. Switch 156 is closed by the tip of lever 36, but the circuit 152 will still be open as switch 154 is in series therewith.

When a reel empties the winding pin will fly out thus releasing the plate 90 of the reel, which is forced out by spring 100, contacting and closing switch 150 at the same time as the lever 36 is released from notch 34. Closing of circuit 148 energizes solenoid 62 to pull back the shaft 52 and bring about rotation of the disc 22.

The movement of the shaft 52 and cam 80 to the left permits the rod 72 to snap upward and thereby permitting closure of switch 154. Switch 156 is then open as the lever 36 has been moved so that circuit 152 will not be closed until the lever 36 falls into the next notch. When this occurs the circuit 152 will be completed energizing solenoid 82 and pulling down locking pin 72 to permit return of shaft 52 to the right. The switch 150 has previously been opened by rotation of the disc 22, thereby de-energizing solenoid 62. Switch 154 will be opened to de-energize solenoid 82 when the pin 72 is pushed down by cam 80.

It should be understood that when the reel which is unwinding becomes empty, the winding pin 98 is snapped out and the spring finger 111 snapping by the pin 113 holds it in extending position. At the same time, the movement of the lever 94 out of the notch 102 releases the outer plate of the reel which moves outward under the force of the spring 100. As the disc 22 starts to rotate the reel is free to move away from the film. It is necessary that the outer plate 99 of the reel carrying the winding pin should be brought to the proper position for picking up the film when it comes to the winding position, and this position is determined by the engagement of one of the spring fingers 118 with the notch 116 of the abutment 114. The friction band 124 will be engaged by the edge of plate 90 to cause rotation thereof to its locked position. When the reel finally comes to the winding position and the winding shaft 52 is released by movement of the latch pin 72, the plate 90 will be forced into its latched position, bringing the winding pin 98 into position to pick up the film and wind it in double coils as rotation begins. The film is therefore continuously fed in the same direction.

Figure 14:
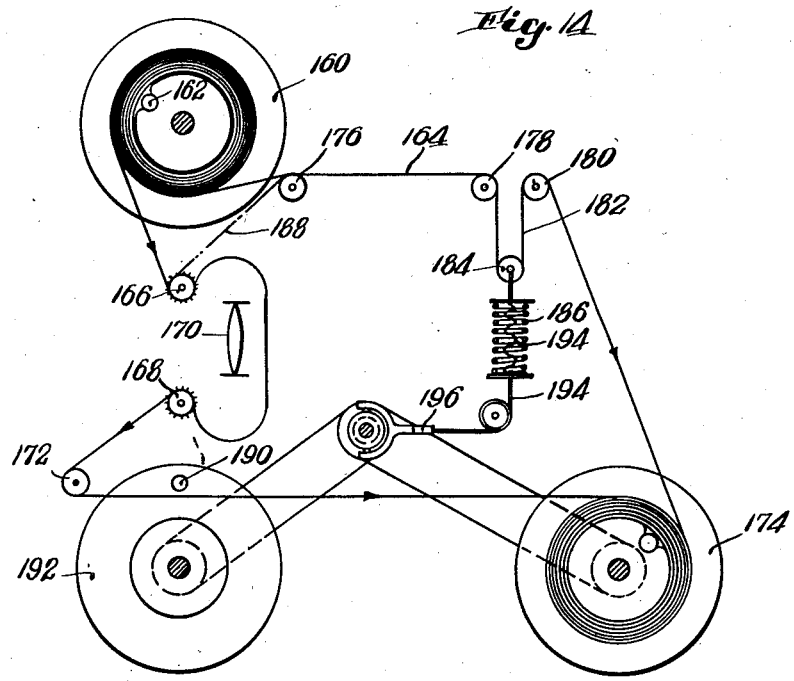
Fig. 14 is a diagrammatic view of a non-rewinding mechanism.
Figure 15:
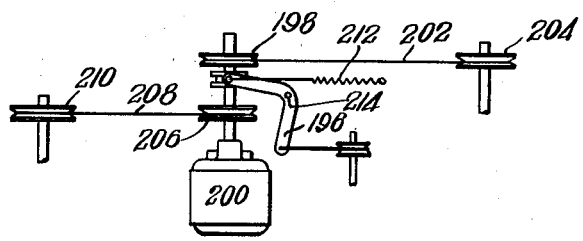
Fig. 15 is a diagrammatic view of the operating mechanism in Fig. 14.

A similar method of winding may be used to project an entire film without requiring re-winding at any time. Referring to Figs. 14 and 15, the reel 160 has a winding pin 162 and is otherwise similar to the reels previously described. The endless film 164 is initially formed in double coils upon the reel 160 and is fed in the direction indicated by the continuously driven brackets 166 and 168 past a projector mechanism 170 provided with the usual intermittent feed; the film then travels along the guide roller 172 and to a reel 174 similar in construction to the reel 160. Reel 174 is initially winding and is drawing film from the reel 160 past the guide roller 176 and guide rollers 178 and 180, as shown. Between the rollers 178 and 180 there is a depending loop of film 182 passing around a roller 184 which is resiliently pulled down by a spring 186. When the reel 160 empties, the film is released therefrom, taking the dotted line position 188; the winding reel 174 will continue to rotate, however, until the mid-point of the film reaches a position adjacent the winding pin 190 of reel 192. During this period the roller 184 is being pulled upwards as the slack of the loop 182 is taken up. When the flexible cable 194 within the spring 186 becomes taut, the bell crank lever 196 will be shifted. Initially the lever 196 is in position to clutch the pulley 198 to the driving shaft of motor 200. Pulley 198 drives pulley 204 through the belt 202 and pulley 204 drives reel 174. Shifting of lever 196 declutches pulley 198 and clutches pulley 206 to drive pulley 210 through belt 208 and produce rotation of reel 192. The bell crank lever 196 is retained in its shifted position by spring 212 which shifts with respect to the pivot 214 for lever 196. Thus when the reel 192 starts to rotate the film will be picked up and wound in double coils so that, when the entire film has passed through the projector, the film is wound upon reel 192 in the same manner as it was originally wound upon reel 160.

It should be understood that my invention relates to the reeling of any endless strip of material which is fed through other equipment controlled by the strip. For example sound film might be handled which is passed through sound reproducing equipment. In the appended claims reference to projection or projecting equipment is intended to cover any apparatus which displays, reproduces or is otherwise controlled by the endless strip which is being fed.

I claim:

1. Film reeling mechanism for an endless strip of untwisted film comprising a rotatably mounted disc, a plurality of reels rotatably mounted on said disc, a supply coil of film wound on one of said reels, the loop of film at the outer portion of the supply reel being passed through film projecting equipment and adjacent an empty reel in winding position, means for driving the reel in winding position to coil the film thereon, means normally holding the disc against rotation, means for releasing the film from the supply reel as the supply coil is used up, means controlled by said last mentioned means for interrupting the driving means for the winding reel, means for releasing the holding means for the disc, means for producing rotation of the disc to shift the full reel to unwinding position and to bring an empty reel to winding position, and means to again cause driving of the reel in winding position.

2. Film reeling mechanism for an endless strip of untwisted film comprising a rotatably mounted disc, a plurality of reels rotatably mounted on said disc, a supply coil of film wound on one of said reels, the loop of film at the outer portion of the supply reel being passed through film projecting equipment and adjacent an empty reel in winding position, means for driving the reel in winding position to coil the film thereon, means normally holding the dic against rotation, means for displacing the supply reel laterally with respect to the film strip when said reel becomes empty, means controlled by the displacement of said reel for interrupting the driving means for the winding reel and simultaneously releasing the holding means to permit rotation of said disc, means automatically effective upon interruption of the driving means for the winding reel to produce rotation of said disc to shift the full reel to unwinding position and to bring an empty reel to winding position, and means to again cause the driving of the reel in winding position.

DANIEL THURBER BRIDGES.